United States Patent [19]

Hasbrouck et al.

[11] Patent Number: 5,483,026
[45] Date of Patent: Jan. 9, 1996

[54] ROTARY SEISMIC SHEAR-WAVE SOURCE

[75] Inventors: Wilfred P. Hasbrouck; Donald B. Hoover, both of Arvada; John C. West, Lakewood; Dennis F. Capron, Arvada, all of Colo.

[73] Assignee: The United States of America as represented by the Secretary of the Interior, Washington, D.C.

[21] Appl. No.: 201,449

[22] Filed: Feb. 24, 1994

[51] Int. Cl.⁶ .................................................. G01V 1/04
[52] U.S. Cl. ........................ 181/121; 181/113; 367/75
[58] Field of Search ........................ 367/75, 189; 181/113, 181/114, 121, 401

[56] References Cited

U.S. PATENT DOCUMENTS

| | | | |
|---|---|---|---|
| 3,302,164 | 1/1967 | Waters et al. | 367/75 |
| 4,244,437 | 1/1981 | Fulkerson | 181/114 |
| 4,321,981 | 3/1982 | Waters | 181/119 |
| 4,609,066 | 9/1986 | Layotte et al. | 181/121 |
| 4,632,215 | 12/1986 | Farris | 181/114 |
| 4,749,057 | 6/1988 | Anstey | 181/121 |
| 4,907,670 | 3/1990 | Anstey | 181/121 |

FOREIGN PATENT DOCUMENTS 702331  12/1979  U.S.S.R. .................. 367/75

*Primary Examiner*—Ian J. Lobo
*Attorney, Agent, or Firm*—E. Philip Koltos

[57] ABSTRACT

An apparatus and a method for generating seismic waves utilizes a heavy flywheel positioned for rotation in a vertical plane to generate and store energy which is then transferred to the ground. The device includes two balanced hammers mounted on the flywheel as impact members. In operation, the flywheel is spun to a predetermined speed and then, on command, the hammers are extended outward from the flywheel so that one hammer strikes either a vertical or a horizontal strike member, thus providing a rapid transfer of a large amount of kinetic energy to the ground resulting in the generation of a set of seismic waves.

18 Claims, 1 Drawing Sheet

5,483,026

ROTARY SEISMIC SHEAR-WAVE SOURCE

FIELD OF THE INVENTION

The present invention is directed to a device for generating seismic shear waves and, more particularly, to a device which utilizes a flywheel to generate shear-horizontal, shear-vertical and longitudinal seismic waves.

BACKGROUND OF THE INVENTION

The study of the geology of the internal structure of the shallow portion of the earth's crust, within 100 meters of the surface, is often conducted using seismic waves. Seismic waves include shear-horizontal (SH), shear-vertical (SV) and longitudinal (P) waves which may be generated using devices which propel an impact mass against a rigid earth contacting target. Measurements of seismic waves may provide detailed information concerning both rock properties and depth.

Conventional devices generate seismic shear waves using a horizontal propulsion of an impact mass. The propulsion force is often administered manually by using a hammer to hit against a weighted plank or metal fixture. For certain applications, these devices have not always been satisfactory, because the amount of force they are capable of generating is limited. In particular, at some landfill sites, the filling material may drastically absorb seismic energy to such an extent that the seismic waves produced by manual hammer devices cannot penetrate to the base of the fill and, thus, the thickness of the fill cannot be seismically determined.

Alternatively, many new designs for seismic wave sources employ pneumatically driven pistons which alternately and oppositely strike contained anvils. These devices are advantageous because they are more powerful than manual hammer devices. However, the problems which occur with these pneumatic devices are those inherent in any closed pneumatic system such as condensation within the cylinders and entrained water in the air supply.

Others have attempted to overcome the problems associated with both the manual hammer and pneumatic devices. Matsuyama, U.S. Pat. No. 5,079,463, for example, discloses the use of a flywheel positioned for rotation in the horizontal plane to generate seismic waves. The flywheel is rotated at a predetermined speed and braked continuously or intermittently to generate a reaction force. However the device is only capable of generating SH waves.

Meissner, et al., "Shear-Wave Exploration: Geophysical Development Series", 1 *Society of Exploration Geophysicists*, 1986, disclose a pneumatically driven shear-wave source. The device provides a more powerful impact than that of a hammer and may be transported to a testing site using a trailer. However, the device requires the use of separate P and S sources. Moreover, the device is constructed such that it is constrained to operate only at right angles to the vehicle on which it is mounted.

Airhart, U.S. Pat. No. 4,660,674 discloses a device for generating seismic waves which can be controlled so as to deliver energy to a point on the earth's surface along a plurality of selected slant paths. The device includes a hollow cylindrical housing and an impact mass slideably interfitted within the housing. The device is capable of generating both SH and SV waves. However, it tends to be somewhat cumbersome since the entire housing must be rotated into alignment with a preset slant path.

SUMMARY OF THE INVENTION

Thus, it is a purpose of the present invention to overcome the disadvantages of the prior art and thereby provide a device for generating seismic waves of greater depth of penetration than those obtainable with conventional shallow-depth sources.

In accordance with a preferred embodiment of the invention there is provided an apparatus for generating seismic waves comprising a striker platform and a rotator assembly mounted on the striker platform. The rotator assembly comprises a flywheel positioned for rotation in a vertical plane, an impact means mounted thereon, and a means for rotating the flywheel. The impact means contacts a horizontal-impact assembly or a vertical-impact assembly to create the seismic wave.

In accordance with another preferred embodiment of the invention there is provided a method of generating seismic waves comprising the steps of positioning a rotator assembly comprising a flywheel having impact means mounted thereon in a location for contacting a strike member, the strike member being coupled to ground; rotating the flywheel in a substantially vertical plane to a required speed to create and store energy; and contacting the impact means with the strike member, whereby the energy is directed into the ground to generate seismic waves.

It is therefore an object of the present invention to provide a single seismic wave source which is capable of generating SH, SV and P waves.

It is another object of the present invention to provide a seismic wave source which is of a size and configuration which allows the device to be transported to a testing site on a small truck or tractor.

It is still another object of the present invention to provide a seismic wave source which may be easily maneuvered to change the direction of striking.

It is yet another object of the present invention to provide a method for producing SH, SV and P seismic waves using a flywheel to generate and store energy.

These and other objects of the present invention will become apparent from the detailed description to follow.

BRIEF DESCRIPTION OF THE DRAWINGS

There follows a detailed description of the preferred embodiments of the present invention which are to be taken together with the accompanying drawing, wherein.

DETAILED DESCRIPTION OF THE PREFERRED EMBODIMENTS

Figures 1, 2:
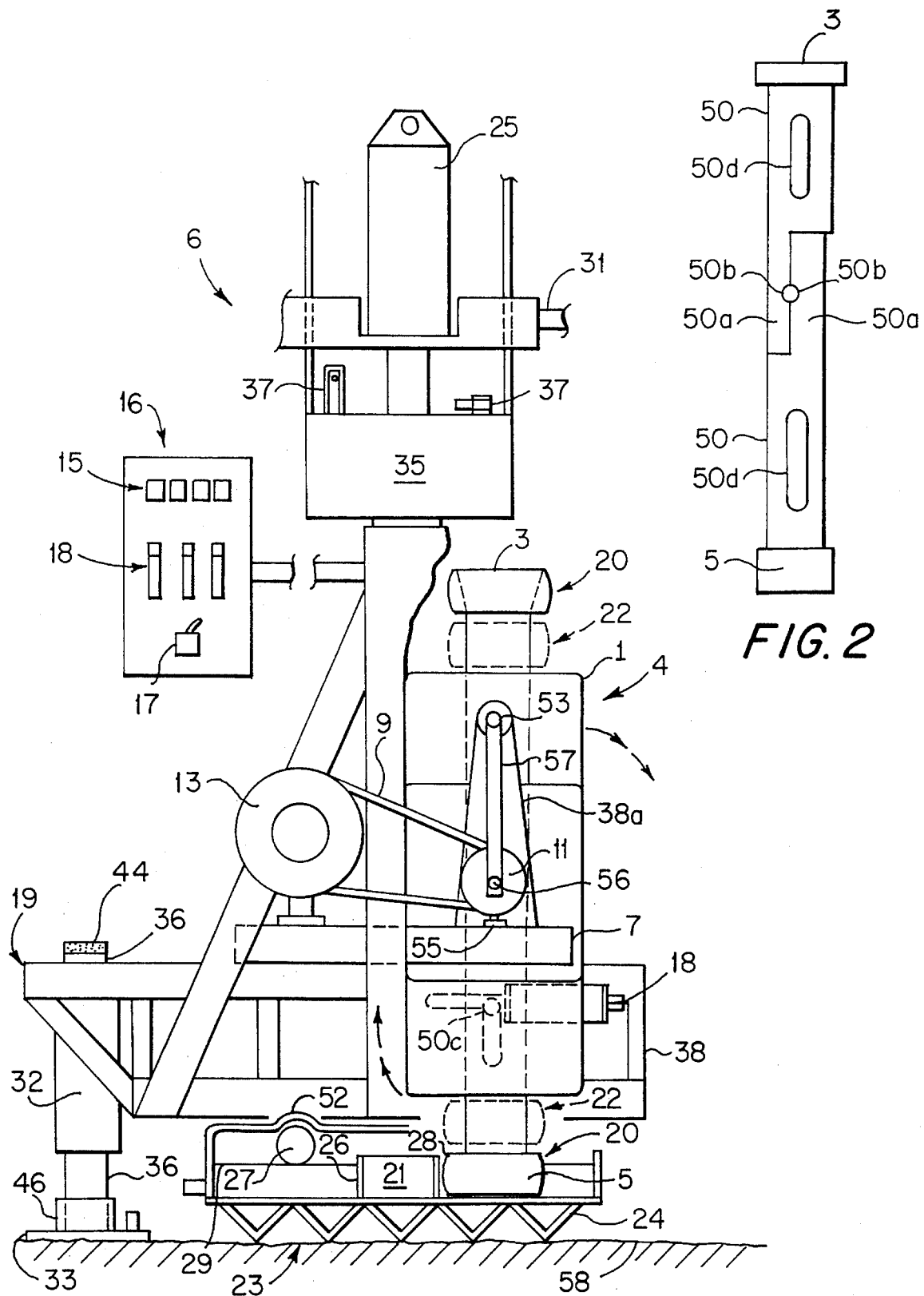
FIG. 1 shows a front elevational view of the rotary seismic wave source of the present invention, with a portion of the device being cut-away to show the detail of the rotator assembly.
FIG. 2 shows a front elevational view of the strike members and interconnection thereof.

Referring now to FIG. 1, a device 6 for producing seismic waves in accordance with the present invention is shown and includes a frame or striker platform 38 (only portions of which are shown). A rotator assembly 4 is used to create and store rotational energy which will eventually be transferred to the ground to generate seismic waves. The rotator assembly 4 comprises a rectangular flywheel 1 formed of sandwich plates providing a central longitudinal bore which is rectangular in cross section. Flywheel 1 rotates in a vertical plane and has impact means mounted radially thereto. The rotator assembly 4 itself is mounted on the striker platform 38 by a pair of uprights 38a (only one of which is shown). In a preferred embodiment, the impact means comprises two balanced hammers 3, 5, that is, hammers which are positioned symmetrically with respect to the rotational axis of the flywheel 1.

As shown in FIG. 2, each hammer 3, 5 includes a handle 50 received in the longitudinal slot of flywheel 1. Each handle 50 includes a reduced portion 50a having a semicircular contact 50b. When cutouts 50b are opposite one another a retention pin 56 passing through flywheel 1 is positioned therein to couple handles 50 together and hence to hold hammer 3, 5 in a retracted position 22 (shown in phantom). When pin 56 is removed (as explained subsequently) from cutouts 50b, reduced portions 50a are no longer coupled to one another and handles 50 together with hammers 3, 5 move to an extended position 20. The outward movement of hammers 3, 5 is restricted by pins 50c mounted to flywheel 1 and extending through both the longitudinal slot of flywheel 1 and slots 50d of handles 50.

The flywheel 1 is rotated by a belt 9 linked between a pulley 11 coupled to the flywheel 1 and a hydraulic motor 13. If a high torque motor is utilized, less than 30 seconds is typically required to bring the flywheel 1 to full speed. The size and weight of the flywheel 1 and the impact means should be such that the desired impact force may be obtained. This involves a consideration of the nature of the material at the test site and depth of the target. Typically, the weight of the flywheel 1, including the impact means, is approximately 130 kg.

Rotational speed of the flywheel 1 may be monitored using any suitable device 6 so that strike force may be selected and equality achieved between forward and reverse horizontal strikes or successive vertical strikes. As shown in FIG. 1, for example, an electric tachometer 15 may be utilized to monitor the revolutions per minute (rpm). When the desired rotational speed is attained, the hammers 3, 5 are set free by manually activating a firing switch 17 or by using an automatic control system.

When the hammers 3, 5 are in the correct position, as determined by cams engaging micro switches, both hammers are moved outward by centrifugal force to an extended position 20. One of the hammers (the active hammer) then impacts the strike member of either a vertical impact assembly 19 or a horizontal impact assembly 23, thereby generating the desired SH, SV and/or P waves. A shock absorber 18, or suitable damping material, is also located within the rotator assembly 4 to limit the shock to the striker platform 38 upon impact with a strike member.

Preferably, the strike member of the vertical impact assembly 19 comprises a vertical cylinder 36 made of steel which is free to slide in an open cylinder 32 mounted to frame 8. The base of the vertical cylinder 36 is positioned within a short vertical cylinder 46 mounted on a vertical-impact base plate 33. Because the base plate 33 may be driven into the ground with repeated hammer strikes, aluminum caps 44 of various lengths can be set on top of the vertical cylinder 36 to maintain the top of cylinder 36 at its proper vertical position relative to the hammers 3, 5. Chains (not shown) are attached to the base plate 33 to free it if it becomes buried with repeated impacts. The chains also to act as a safety restraint on the base plate 33.

The horizontal impact assembly 23 preferably comprises a raised strike member 21 made of steel covered with replaceable aluminum plates 26 and mounted on a horizontal-impact base plate 24. The strike member 21 is attached to the base plate 24, preferably by welding. In order to ensure that impact energy delivered from the flywheel 1 and hammers 3, 5 is directed into the ground and not back to the device 6, friction between the striker platform 38 and horizontal impact base plate 24 must be reduced. The motion of the horizontal-impact assembly 23 is, therefore, preferably isolated from the rotator assembly 4 by hardened cylinders 27 which are housed in bearings 52 on the striker platform 38 such that cylinders 27 are free to rotate on knife-edge tracks 29 mounted on the horizontal-impact base plate 24. The tracks 29 are comprised of the upper edges of wedges, the bases of which are welded to the base plate 24. The wedges also serve to stiffen the base plate 24 and thus diminish flexural modes within it.

The impact base plates 24, 33 are coupled to the ground 58 by their own weight and, optionally, with an additional vertical force applied by a hydraulic lift and load cylinder 25 which is also used to lift the device 6. Once the base plates 24, 33 are well embedded, the downward force provided by the load cylinder 25 can be relieved to a degree that the base plates 24, 33 are free to move and thus isolate the movement from the rotator assembly. The impact base plates 24, 33 should be of a size and shape which maximizes actual contact with the ground 58. Because the horizontal impact base plate 24 is much larger than the vertical impact base plate 33, its size and shape are of particular concern. Thus, in a preferred embodiment, the plate 24 is square and approximately two feet by two feet in dimension. The square shape is preferred over that of the conventional elongated base plate because the latter often does not make adequate contact with the ground if it is undulating or rocky. Start-time of the hammer impacts may be monitored using appropriate means such as an inertial switch mounted on the impact base plates 24, 33.

The flywheel 1 may be rotated either clockwise or counterclockwise upon reversing the direction of the motor 13. The flywheel 1 and motor 13 are both mounted on a sliding platform 7 to allow lateral adjustment of the circular path of the hammers 3, 5 so that either of the opposed ends 26, 28 of the strike member 21 may be impacted. In this embodiment, the strike member 21 is substantially identical at opposed ends 26, 28. FIG. 1 shows a configuration in which the horizontal-base plate 24 is in a first position such that the strike member 21 is struck on the right end 28 by the clockwise rotation of the flywheel 1. By sliding the platform 7 to the left in a second position and reversing the direction of the motor 13, the strike member 21 may be struck on the left end 26 using a counterclockwise rotation of the flywheel 1. In yet a third position to the left of the second position, the vertical strike member 36 may be struck.

When the flywheel 1 is rotating clockwise and the hammer 3, 5 strikes the strike member 21, the horizontal impact assembly 23 will be moved to the left thus imparting a shearing motion to the ground 58. The hammer 22 will then undergo recoil causing the horizontal impact assembly 23 to be moved to the right. Some friction exists between the horizontal impact assembly 23 and the striker platform 38, thereby slowing the recoil movement. The shock absorber 18, preferably a hard rubber cylinder, not only dampens the right motion of the horizontal impact assembly 23, but also keeps the horizontal impact assembly 23 from sliding off the striker platform 38. A similar shock absorber system (not shown) is activated when the strike member 21 struck to the right with counterclockwise motion of the flywheel 1.

The device 6 further includes means for adjusting the horizontal direction of impact, or strike direction, when horizontal impact assembly 23 is used. Preferably, the means comprises an azimuth bearing 35 and index, or alignment, pins 37 which allow the device 6 to be oriented in twelve directions at 30 degree increments relative to a stationary frame 31, thereby providing for adjustment of the strike direction.

In a preferred method of operation, the flywheel 1 is brought to a speed slightly greater than that desired, as indicated by a tachometer 15 mounted in a control panel 16. Upon attaining this speed, the motor 13 is stopped and the flywheel 1 is allowed to slow to the required speed. When proper speed is indicated, the firing switch 17 is thrown. Soon after the hammer passes a microswitch 55, voltage is sent to a solenoid 53 which, in turn, activates a lever 57 which pulls the hammer retention pin 56. The two hammers 3, 5 are then set free to move outward by centrifugal force.

The device 6 of the present invention is of a size and configuration which enables it to be connected to frame 31 conveniently mounted on a transport vehicle. In particular, a one-ton truck with dual rear wheels and enclosed side boxes has been utilized as transportation means. During transport to the work site, the device 6 is laid over into the truck bed using a system of hydraulic cylinders. During operation at the field site, it is not necessary to reload the device 6 onto the truck for transport. Rather, hydraulic lift and load cylinder 25 may be used to lift the device 6 vertically, typically about 25 cm, for short distance transport. A mirror system on the truck may also be utilized to aid in positioning the device 6 at the proper location.

The device 6 is safely operated by one person using a control panel 16 located on or near the device 6. In addition to the tachometer 15 and firing switch 17, the control panel 16 may also be used to house the controls 18 for hydraulics used to control the motor 13, lay over the device 6 into and out of the truck bed, and raise and lower the device 6 through the use of lift and load cylinder 25. The system may be operated at night with the aid of lights focused on the rotator assembly 4. During operation, the base plates 24, 33 are also typically surrounded by an acoustic shield that also serves as a safety barrier.

In an alternative embodiment, the device 6 of the present invention is mounted on a small construction tractor by replacing the front loader assembly of the tractor with the device 6. The tractor is then transported on a trailer and unloaded at the field site. Use of a tractor enables the traversal of more rugged terrain and, consequently, greater access to areas which could not be reached by a one-ton truck. Furthermore, a tractor equipped with a backhoe allows loose material at sites to be scraped away, thereby enabling the base plates 24, 33 to be set on more solid ground to improve device 6 coupling.

In side-by-side tests, a prototype of the present device 6 run at one-third speed produced seismic waves with approximately four times the amplitude obtained with a 9.1 kg hammer manually swung against a firmly coupled steel fixture by a 1.96 meter tall person. Moreover, because the output of the rotary source increases as the square of the rotational speed, whereas the attainable length of the piston throw and the amount of air pressure that realistically can be developed and applied in the pneumatic device 6s is limited, the rotary source has an inherently greater potential for generating more output than a pneumatic device 6.

While the impact velocity of the hammer is limited to the speed at which a person can swing the hammer, the flywheel 1 can revolve at up to 270 rpm. Because the amount of energy produced varies as a function of the square of the velocity of impact, a doubling of the speed will result in a four-fold increase in output. The flywheel 1 is also not controlled by the strength and endurance of its operator as is a manual hammer, thus it can be operated all day without diminution of output. Moreover, uniformity and repeatability of output can be better maintained with a mechanical device 6.

Although the invention has been described in considerable detail with respect to preferred embodiments thereof, variations and modifications will be apparent to those skilled in the art without departing from the spirit and scope of the invention as set forth in the claims.

We claim:

1. An apparatus for generating seismic waves in a ground comprising:

a striker platform including a horizontal-impact assembly and a vertical-impact assembly both of which are engageable with the ground;

a rotator assembly mounted on the striker platform, the rotator assembly comprising a flywheel positioned for rotation in a vertical plane and two balanced hammers mounted on the flywheel and extending from opposite sides of the flywheel for selectively impacting the horizontal-impact assembly or the vertical-impact assembly; and a means for rotating the flywheel.

2. The apparatus according to claim 1 wherein the means for rotating comprises a hydraulic motor.

3. The apparatus according to claim 1 wherein the horizontal-impact assembly comprises:

a horizontal-impact base plate;

a strike member mounted on the base plate;

tracks mounted on the base plate; and cylinders mounted on said striker platform and movable on the tracks, whereby the striker platform is isolated from motion of the horizontal impact assembly.

4. The apparatus according to claim 3 wherein the vertical-impact assembly comprises:

an open cylinder mounted on said striker platform;

a vertical cylinder freely slidable in the open cylinder and having a base; and a vertical impact base plate having a short vertical cylinder mounted thereon in which the base of the vertical cylinder is positioned.

5. The apparatus according to claim 4 wherein the vertical-impact assembly further comprises at least one aluminum cap mounted on top of the vertical cylinder.

6. The apparatus according to claim 1 further comprising a transport means for transporting and positioning the strike platform, and a means for adjusting a strike direction of the horizontal-impact assembly relative to the transport means.

7. The apparatus according to claim 6 wherein the means for adjusting strike direction comprises an azimuth bearing and index pins for the bearing provided between the striker platform and the transport means.

8. An apparatus for generating shear horizontal, shear vertical and longitudinal seismic waves comprising:

a striker platform having a horizontal strike member which engages the ground and a vertical strike member which engages the ground;

a slidable platform movable with respect to said striker platform;

a rotator assembly mounted on the slidable platform, the rotator assembly comprising a flywheel positioned for rotation in a vertical plane and two balanced hammers mounted on the flywheel such that said hammers are engagable in a first position with said horizontal strike member and in a second position with said vertical strike member; and a means for rotating the flywheel in opposite directions mounted on said slider platform.

9. The apparatus according to claim 8 further comprising a means for maintaining the hammers in a retracted position during a start-up rotation of said flywheel and for releasing the hammers to an extended position to contact one of the strike members after start-up rotation is completed.

10. The apparatus according to claim 8 wherein the means for rotating the flywheel comprises a hydraulic motor, a pulley on the flywheel and a belt connecting the hydraulic motor and pulley.

11. The apparatus according to claim 8 further comprising a transport means for transporting the striker platform and a means for lifting and moving the apparatus relative to the transport means.

12. A method of generating seismic waves comprising the steps of:

positioning a rotator assembly comprising a flywheel having two balanced hammers mounted thereon in a position for contacting a strike member, the strike member being coupled to ground;

rotating the flywheel in a substantially vertical plane to a required speed to create and store energy; and moving the hammers outward by centrifugal force from a retracted position to an extended position to impact the strike member, whereby the energy is directed into the ground to generate seismic waves.

13. The method according to claim 12 wherein the rotator assembly is mounted to a slidable platform movable with respect to a striker platform to which the striker member is attached and further including the steps of moving the slidable platform between a first position such that as the flywheel is rotated in a first direction the impact means impacts a horizontal strike member on a first side and a second position such that as the flywheel is rotated in a second, opposite, direction the impact means impacts the horizontal strike member on a second, opposite side.

14. The method according to claim 13 wherein the moving step further includes the moving of the slidable platform to a third position such that as the flywheel is rotated the impact means impacts a vertical strike member.

15. An apparatus for generating seismic waves in a ground comprising:

a striker platform including a horizontal-impact assembly and a vertical-impact assembly both of which are engageable with the ground;

a sliding platform moveable with respect to said striker platform;

a rotator assembly mounted on the sliding platform, the rotator assembly comprising a flywheel positioned for rotation in a vertical plane and an impact means mounted on the flywheel for selectively impacting the horizontal-impact assembly or the vertical-impact assembly; and a means for rotating the flywheel.

16. The apparatus according to claim 15 wherein the horizontal-impact assembly comprises:

a horizontal-impact base plate;

a strike member mounted on the base plate;

tracks mounted on the base plate; and cylinders mounted on said striker platform and movable on the tracks, whereby the striker platform is isolated from motion of the horizontal impact assembly.

17. The apparatus according to claim 15 wherein the vertical-impact assembly comprises:

an open cylinder mounted on said striker platform;

a vertical cylinder freely slidable in the open cylinder and having a base; and a vertical impact base plate having a short vertical cylinder mounted thereon in which the base of the vertical cylinder is positioned.

18. The apparatus according to claim 15 wherein the means for rotating the flywheel comprises a hydraulic motor, a pulley on the flywheel and a belt connecting the hydraulic motor and the pulley.

* * * * *